Figure 4:
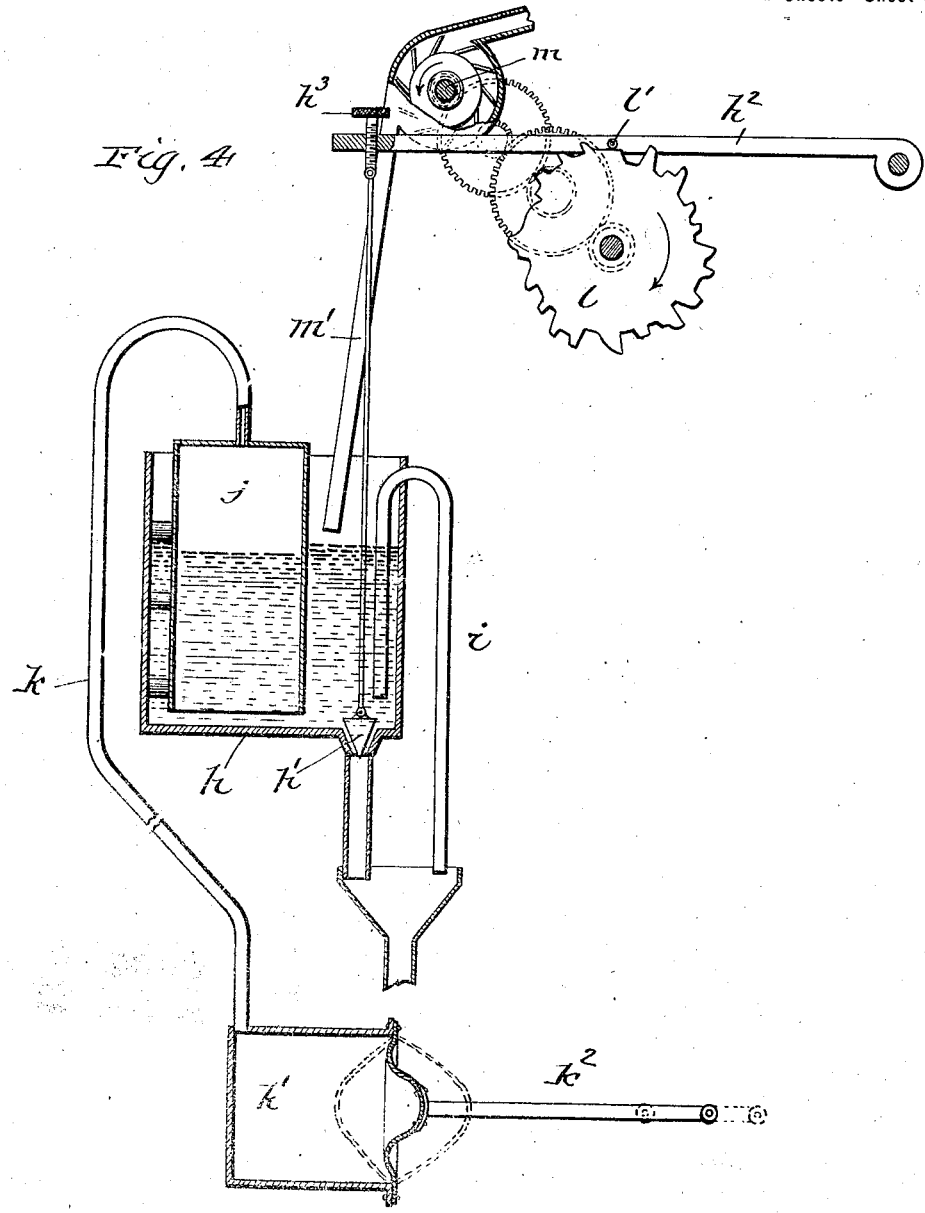

No. 616,022. Patented Dec. 13, 1898.
E. H. SCHILD.
ADVERTISING SIGN.
(Application filed May 26, 1897. Renewed Mar. 23, 1898.)
(No Model.) 2 Sheets—Sheet 1.
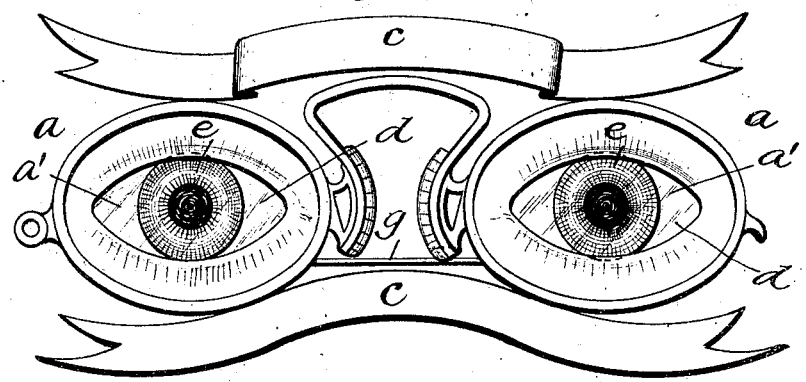
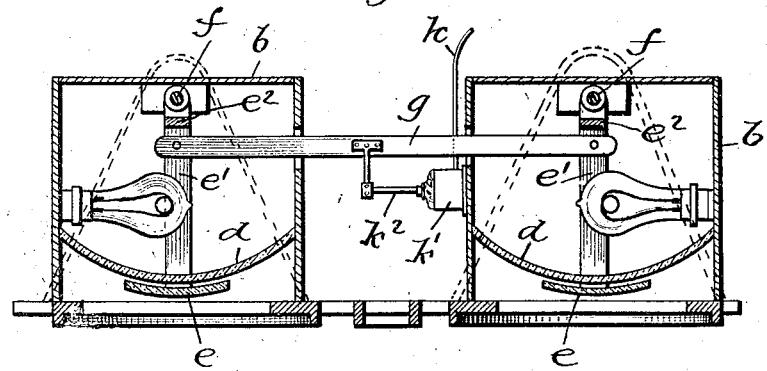
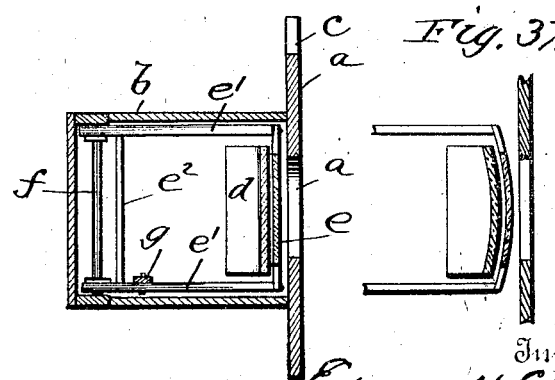
Witnesses
Inventor
Edward H. Schild
By Alexander & Davis
Attorneys No. 616,022. Patented Dec. 13, 1898.
E. H. SCHILD.
ADVERTISING SIGN.
(Application filed May 26, 1897. Renewed Mar. 23, 1898.)
(No Model.) 2 Sheets—Sheet 2.

Witnesses Inventor

UNITED STATES PATENT OFFICE.

EDWARD H. SCHILD, OF BALTIMORE, MARYLAND, ASSIGNOR OF ONE-HALF TO HENRY CASTELBERG, OF SAME PLACE.

ADVERTISING-SIGN.

SPECIFICATION forming part of Letters Patent No. 616,022, dated December 13, 1898.

Application filed May 26, 1897. Renewed March 23, 1898. Serial No. 674,941. (No model.)

*To all whom it may concern:*

Be it known that I, EDWARD H. SCHILD, a citizen of the United States, residing at Baltimore, State of Maryland, have invented certain new and useful Improvements in Advertising-Signs, of which the following is a specification, reference being had therein to the accompanying drawings.

In the drawings annexed, Figure 1 is a front view of the sign; Fig. 2, a horizontal section thereof; Fig. 3, a transverse vertical section; Fig. 3½, a detail view of the eyeball-representing devices, and Fig. 4 a diagrammatical view of the motor I prefer using to operate the movable parts.

The invention is designed especially for the use of opticians; but it may be used in other businesses, if desired, as will be seen more fully hereinafter.

The invention consists, essentially, of a frame, preferably a representation of an eyeglass or spectacles, having, preferably, a pair of elliptical or similarly-shaped openings to correspond with the eye-openings on the human or other face, and in combination therewith preferably a pair of artificial eyes supported in a casing or casings directly behind the eye-openings and adapted to have imparted to them a lateral movement with respect to the eye-openings to simulate the movements of the human or other eye when glancing from side to side, as more fully hereinafter set forth. By preference the part representing the frame of the eyeglass is made opaque and the parts representing the eyes are made translucent and inclosed in a casing or casings containing means for illuminating their interior, whereby the sign will be rendered effective in the dark.

The invention also consists of means for positively shifting the movable parts representing the eyes intermittently and irregularly, causing them to remain still or fixed at intervals, thereby more nearly resembling the movements of the human or other eyes, as more fully hereinafter set forth.

Referring to the drawings by letters, $a$ designates the main frame, which is made in the form of an eyeglass and is provided with the two elliptical openings $a'$, one being formed in each elliptical part of the eyeglass. Behind each opening is fastened a closed casing $b$, which may be formed rectangular, as in full lines in Fig. 2, or may be tapered toward the rear, as shown in dotted lines in Fig. 2; but it is immaterial as to the shape of these casings, it being simply necessary that they be made of such a shape and size as not to be too plainly visible, if at all, from the front. Suitable scrolls or sign-plates $c$ may be attached to the frame for the reception of suitable advertising matter.

Within each casing, directly behind the eye-opening, is supported a translucent convex plate $d$, the surface of which will preferably be polished and colored to resemble the human eyeball. This plate $d$ is shown in the main figures as being convexed in but one direction—namely, longitudinally—but, of course it may also be convexed transversely, as shown in Fig. 3½, to resemble more nearly the sclerotic coat of the eyeball. In front of the plate $d$ and directly behind the eye-opening in the opaque frame is a translucent disk $e$, which is supported upon a frame consisting of horizontal bars $e'$ and a vertical bar $e^2$, the respective bars $e'$ working above and below the plate $d$. These frames extend backward to the rear of their respective casings, and each is swung therein upon the vertical pivot $f$, this pivot being located approximately in the center of a circle struck from the arc-shaped plate $d$, so that when the frames are vibrated the disks $e$ will move in unison with each other and parallel with the said plates $d$. Each disk $e$ is convexed to correspond to its adjacent plate $d$. The disks $e$ are made of translucent material and are colored to represent the pupil and iris of the eye. I have shown an incandescent electric lamp in each casing back of the plates $d$ and $e$ to illuminate the apparatus in the dark; but of course it is understood that any other suitable means may be employed for that purpose.

The two swing-frames are connected by a rod $g$, which extends horizontally through the adjacent sides of the casing. To reciprocate this bar $g$ and thereby cause the disks $e$ to move in unison from side to side, I may employ any suitable motive power. In Fig. 4 I show one form of such motor. In this construction I employ a suitable tank $h$, provided in its bottom with an exit-opening controlled by a vertically-working valve $h'$, this valve being adjustably supported on the free end of a lever $h^2$ by means of a screw $h^3$, said lever being pivoted at its opposite end to a suitable stationary part above the tank. A suitable siphon $i$ is connected to the tank to automatically run off the water when the tank fills up and there is danger of overflowing. Rigidly supported in a vertical position in the tank is an inverted air-chamber $j$, open at its bottom and closed at its top. Connected to the top of this air-chamber is an air-tube $k$, which extends to a small cylinder or air-chamber $k'$, attached to one of the casings $b$ at a suitable point. One end of this chamber $k'$ is closed by a flexible membrane, and this membrane is connected by a rod $k^2$ to the rod $g$ or other movable part of the apparatus. Journaled below the lever $h^2$ is a wheel $l$, which is provided at its edge with a continuous series of cam-like projections, upon which rests a lateral pin or roller $l'$, carried by the lever. This disk receives its motion from a suitable train of gearing, that in turn is driven by a small water-wheel $m$, journaled in a suitable frame above the lever. The water that runs the water-wheel is emptied by a tube $m'$ into the tank $h$, as shown. The operation of this motor is as follows: As the water flows into the tank $h$ the water-wheel will be rotated quite rapidly, and the motion of the water-wheel will be communicated to the cam-wheel through the train of gearing, the intermediate gearing serving to reduce the speed and correspondingly augment the power. As the cam-wheel rotates, the lever to which is attached the valve $h'$ is vertically vibrated, the vibrations being intermittent and irregular or variable. As the lever is vibrated the valve will be intermittently opened and closed, the valve being closed when the pin $l'$ on the lever rests in the lower parts of the cam and being opened wide when resting on the outermost projections of the cam-surface. In other words, the valve is operated so as to vary the size and at times entirely close the exit-opening, so that the height of the water in the tank is being constantly varied, except when the valve is so held that the exit-opening is just large enough to carry off the amount of water entering the tank, when of course the level of the water will remain stationary. As the quantity of the water in the tank is thereby made to vary, the pressure in the air-chamber $j$ and connecting-tube $k$ will be correspondingly varied, and this varying pressure will cause the diaphragm in chamber $k'$ to move in and out in an irregular manner. The greater the pressure the greater the projection of the diaphragm. In this manner I impart to the movable parts of the eye an irregular or variable intermittent motion, causing said movable parts to come to rest and remain at rest any period of time at various points. In this way the natural roving movement of the eyeballs may be closely simulated, making the sign very effective in attracting and holding the attention of observers.

The advantage in employing a separate disk to represent the iris and pupil is that it avoids the necessity of shifting the larger plate representing the eyeball. If this latter plate were shifted and the iris and pupil made a part thereof or indicated thereon, it will be seen that the casings would require to be much enlarged laterally, and this enlargement would extend beyond the front frame, making them visible from the front and thereby destroying to a considerable extent the effectiveness of the sign.

It will be observed that another advantage lies in the fact that the plate representing the eyeball is convexed and the disk representing the pupil and iris is similarly convexed and made movable over the surface of the plate, the path of the disk being of course curved, whereby the natural rolling movements of the human eyeball will be closely simulated.

It will be obvious that the body of air confined between the variable liquid surface and the movable membrane is confined in the separate chambers $j$ and $k'$ simply for the purpose of convenience, it being convenient in the present use of the motor to attach the chamber $k'$ to a convenient part of the casings and to locate the tank and other parts of the motor at some distance from the sign—say in the cellar or below the shop window or counter. Should it be desired, (and it is thought it may be desirable in some cases,) the two vessels $j$ and $k'$ may be connected directly and used as one chamber, doing away with the connecting-tube. I therefore do not confine myself to the specific arrangement shown. In fact, both with reference to the sign proper and the motor, I reserve the right to vary the detail construction without departing from my invention. It is also obvious that it is within the spirit of the invention to employ but one set of movable eyeball-representing devices, although it is much preferable, especially for opticians' signs, to employ the two sets of devices. When one set only is employed, the other set of devices may be disconnected from the shifting-rod, or the eye-opening may be partially or entirely closed to give a comical appearance to the apparatus.

It will be seen, further, that the peculiar advantage of the motor I use lies in the fact that the variations in the movements of the eyeball-representing devices are rendered practically infinite—that is to say, the rapidity of the movements and the durations of the periods of rest, as well as the points of rest, are constantly being varied and the variations are practically infinite. It would seem at first glance that the movements of the eye-representing devices would be predetermined— that is, that they would invariably come to rest at certain predetermined points and move at predetermined speeds—but such is not the case. This is owing to the fact that the quantity of water in the tank is constantly being varied because of the variation in the speed with which it discharges itself, notwithstanding the fact that the inflow may be and is preferably regular, and the rapidity of discharge will not only depend on the size of the outlet, but will also, of course, depend on other conditions, principally on the weight of liquid in the tank. In this manner the intermittent movements of the eye-representing parts within certain limits will be very varied and will therefore simulate closely the movements of a natural eye—the important desideratum in this invention. Even after the cam-wheel has made a complete revolution and begins another the movements of the eye-representing parts will not be duplicated, as the quantity of water in the tank and other conditions will be different at the beginning of the second revolution and throw out or vary all the subsequent movements of the eye-representing devices, and as this will obviously be the case at the beginning of each revolution of the disk it will render the stopping of the eye-representing devices at exactly the same point a thing of the remotest contingency. The value of this constantly-varying series of movements will be obvious when it is remembered that the effectiveness of an advertising apparatus of this sort depends to a great degree on the elimination of all monotony and regularity of movement, since the resemblance to the natural movements is destroyed by regularity and monotony. For instance, should the present device be operated facing a crowd of observers the movements of the artificial eyes and the points of rest will be so constantly varied that the eyes will not, except in the remotest contingency, be directed to exactly the same point twice, the angle of sight constantly varying, thereby keeping the attention and interest of the observers to the last by the unusual life-like appearance, and the variation need only be infinitesimal, since it is well known that the human eye possesses a wonderful power to distinguish exceedingly slight variations in the angles of sight of other eyes under observation.

It is obvious that the eye-openings may be covered with glass or other transparent material, as the function of the openings remains the same whether glazed or not.

Having thus fully described my invention, what I claim, and desire to secure by Letters Patent, is—

1. In a motor, the combination of a fluid-chamber, and a movable part closing the same and adapted to be connected to the part to be operated, a liquid-tank connected to said fluid-chamber and adapted to vary the fluid-pressure therein, and means for irregularly varying the quantity of liquid in the tank, and thereby irregularly varying the level of the liquid, substantially as and for the purpose described.

2. In a motor for advertising devices, the combination of a closed chamber provided with a movable part, adapted to be connected to the part to be moved, another air-chamber connected with said chamber, a tank connected with this latter air-chamber, and means for automatically and irregularly varying the quantity of liquid contained in the tank, and thereby irregularly varying the level of said liquid, whereby the pressure on the movable part will be varied, as and for the purposes set forth.

3. In a motor, the combination of a liquid-tank, a valve controlling the outflow of liquid therefrom, means for shifting said valve, said means consisting essentially of a movable part connected to the valve and a cam-disk for operating said movable part and means for operating the cam-disk, and an air-reservoir connected to the liquid-space of the tank, and a movable part closing said reservoir and adapted to be attached to the part to be operated, substantially as and for the purposes set forth.

4. In a motor, the combination of a liquid-tank having a variable outlet, means adapted to be operated by varying the level of the liquid in said tank, means for supplying a stream of liquid to the tank, mechanism for controlling said variable outlet, and mechanism operated by said stream of liquid and adapted to operate the mechanism controlling the outlet, substantially as described.

5. A motor for shifting advertising devices, consisting of an air-chamber having a movable part closing its open end, means for connecting this part to the part to be moved, a liquid-tank, having its air-space in communication with said air-chamber, a valve controlling the exit of this tank, a part operating said valve, a wheel carrying a series of irregular cams adapted to vibrate this part, a train of gearing adapted to rotate the cam-wheel, a water-wheel operating this train of gearing, and a supply-pipe connected to the water-wheel and the tank, substantially as described.

6. In a sign, the combination of a frame provided with an eye-opening, eye-representing devices supported behind said opening, and positively-propelled mechanical devices for laterally shifting said eye-representing devices back and forth and causing them to come to rest and remain at rest at points intermediate the extremities of the strokes, as and for the purposes set forth.

7. In an advertising apparatus, the combination of a frame provided with an eye-opening, a laterally-movable translucent part representing an eye behind said opening, a casing embracing said translucent part, means for illuminating the interior of said casing, and positive means for laterally shifting said translucent part back and forth and causing it to come to rest at points intermediate the extremities of the strokes, substantially as set forth.

8. In a sign, the combination of a frame provided with an eye-opening, eye-representing devices supported behind said opening, and positively-propelled mechanical devices for laterally shifting said eye-representing devices back and forth and causing them to come to rest and remain at rest at points intermediate the extremities of the strokes, the points of rest varying, as and for the purposes set forth.

9. In an advertising device, the combination of a frame provided with an eye-opening, a translucent stationary plate behind said opening, a movable disk representing the pupil and iris of an eye supported in front of said plate and made translucent, means for inclosing the plate and disk, means for illuminating the inclosure, and means for shifting the disk back and forth in a curved path between the eye-opening and the stationary plate, the disk being always in view and its curved path lying in the arc of a circle whose axis is behind the eye-opening and approximately at right angles to the plane of the lateral diameter thereof, substantially as described.

10. In an advertising device, the combination of a frame provided with an eye-opening, a convexed plate supported back of said opening and representing the pupil and iris of an eye, a frame carrying said plate, and means for positively shifting the plate back and forth behind said opening in a curved path, said path lying in the arc of a circle whose axis is behind the eye-opening and approximately at right angles to the plane of the lateral diameter thereof, substantially as described.

11. In an advertising apparatus, the combination of a frame having an opening, a stationary convex plate supported behind said opening and representing the eyeball of an eye, a similarly-convexed disk supported in front of said plate and representing the pupil and iris of an eye, and means for supporting said disk and moving it laterally back and forth across the face of the stationary plate, substantially as set forth.

12. In an advertising-sign, the combination of a frame having an opening, a convexed plate supported in the rear of said opening, a similarly-convexed disk supported between the opening and said plate and representing the pupil and iris of an eye, and means for shifting said disk back and forth behind the opening, substantially as set forth.

13. In an advertising device, the combination of a frame provided with an eye-opening, movable eye-representing devices supported behind said opening, positively-propelled devices for imparting a series of back-and-forth lateral movements to the eye-representing devices, and for varying the periods of rest and points of rest of said devices, substantially as set forth.

14. In a motor, the combination of a fluid-chamber, a movable part closing the same and adapted to be connected to the part to be operated, a liquid-tank connected to said fluid-chamber and adapted to vary the fluid-pressure therein, and means for irregularly varying the level of liquid in the tank whereby the pressure on the movable part will be irregularly varied.

In testimony whereof I affix my signature in presence of two witnesses.

EDW. H. SCHILD.

Witnesses:
C. D. DAVIS,
H. CASTELBERG.